(12) United States Patent
Brunsch, Jr. et al.

(10) Patent No.: US 7,938,004 B1
(45) Date of Patent: May 10, 2011

(54) SYSTEMS AND METHODS FOR ANGULAR RATE AND POSITION MEASUREMENT

(76) Inventors: James P. Brunsch, Jr., Rapid City, SD (US); David A. Bittle, Somerville, AL (US); Julian L. Cothran, Arab, AL (US); Gary T. Jimmerson, Athens, AL (US); Russell S. Garner, Huntland, TN (US)

( * ) Notice: Subject to any disclaimer, the term of this patent is extended or adjusted under 35 U.S.C. 154(b) by 664 days.

(21) Appl. No.: 12/053,402

(22) Filed: Mar. 21, 2008

(51) Int. Cl.
*G01P 21/02* (2006.01)
*G01P 1/02* (2006.01)
*G01P 9/04* (2006.01)
*G05D 1/10* (2006.01)

(52) U.S. Cl. ........... 73/509; 73/504.03; 73/511; 73/526; 701/10; 701/13; 702/96

(58) Field of Classification Search ............ 73/495–497, 73/504.03–504.04, 504.12, 509–511, 526, 73/1.37–1.38; 701/4, 7, 10, 13; 702/92–96, 702/141, 144–145, 150–153
See application file for complete search history.

(56) References Cited

U.S. PATENT DOCUMENTS

| | | | |
|---|---|---|---|
| 5,698,784 | A | 12/1997 | Hotelling et al. |
| 6,347,763 | B1 | 2/2002 | Harkins et al. |
| 6,401,621 | B1* | 6/2002 | Davis et al. .................... 102/232 |
| 6,504,385 | B2 | 1/2003 | Hartwell et al. |
| 6,843,126 | B2 | 1/2005 | Hulsing, II |
| 6,891,239 | B2* | 5/2005 | Anderson et al. ............. 257/414 |
| 7,258,012 | B2 | 8/2007 | Xie |
| 2005/0024231 | A1* | 2/2005 | Fincher et al. ............. 340/854.4 |
| 2006/0184336 | A1 | 8/2006 | Kolen |
| 2006/0260401 | A1* | 11/2006 | Xie ............................ 73/514.32 |
| 2007/0032951 | A1 | 2/2007 | Tanenhaus et al. |
| 2008/0105050 | A1* | 5/2008 | Kraetz ........................... 73/496 |

FOREIGN PATENT DOCUMENTS
EP    1731996 A2 * 12/2006

OTHER PUBLICATIONS

Drew Karnick et al., "Honeywell Gun-hard Inertial Measurement Unit (IMU) Development," IEEE, Apr. 2004, pp. 49-55.
Steven Nasiri, "A Critical Review of MEMS Gyroscopes Technology and Commercialization Status," Invensense, 8 pages, by Jun. 2008.
Anthony Kim and M.F. Golnaraghi, "A Quaternion-Based Orientation Estimation Algorithm Using an Inertial Measurement Unit," IEEE, Apr. 2004, pp. 268-272.
I.W. Scaysbrook et al., "A Miniature, Gun-Hard MEMS IMU for Guided Projectiles, Rockets and Missiles," IEEE, Apr. 2004, pp. 26-34.
Northrup Grumman LN-200 Fiber Optic Inertial Measurement Unit Specification Sheets, 2 pages, by Jun. 2000.
Gladiator Technologies, Inc. MEMS Landmark 10 Digital IMU Specification Sheets, 2 pages, Nov. 2007.

* cited by examiner

*Primary Examiner* — Thomas P Noland
(74) *Attorney, Agent, or Firm* — Thomas, Kayden, Horstemeyer & Risley, LLP.

(57) ABSTRACT

Disclosed herein are systems and methods of angular rate and position measurement that combine a small footprint with hardening and isolation technologies that allow it to function in acceleration, angular rate, noise and vibration environments that cause other gyroscopes to either fail or to produce erroneous outputs. An example embodiment contains a triad of accelerometers, a triad of gyroscopes, analog and digital ancillary electronics and a processor housed within a housing which is also filled with vibration reducing encapsulating compound. The disclosed systems and methods of angular rate and position measurement are capable of measuring and correcting internal errors and perturbations caused by the longitudinal and angular accelerations and temperature excursions of aerospace vehicles, isolating the gyroscope elements from the effects of acoustic noise and vibration, and accurately measuring the relatively small pitch and yaw oscillations of the vehicle in its flight path trajectory.

13 Claims, 4 Drawing Sheets

SYSTEMS AND METHODS FOR ANGULAR RATE AND POSITION MEASUREMENT

STATEMENT OF GOVERNMENT INTEREST

The invention was made with Government support by the Department of the Army. The Government has certain rights in the invention.

TECHNICAL FIELD

The present disclosure is generally related to electromechanical devices and, more particularly, is related to systems and methods for angular rate and position measurement.

BACKGROUND

Gyroscopes are often used in the field of aerospace vehicle angular rate and position measurement and in other commercial applications with exposure to high levels of vibration. Gyroscope sensors for aerospace vehicles have typically utilized fiber optic or ring laser technology to sense perturbations in the yaw and pitch axes of the vehicle's trajectory. These gyroscopes typically have a base diameter of approximately three inches and a height of approximately four inches. Their cost may be greater than $30,000 per unit, reflecting their complexity and precision. The comparatively large size of fiber optic or ring laser gyros requires these gyros to be integrated internally into an aerospace vehicle's airframe structure. Incorporating them into a previously manufactured vehicle that contains no internal mounting provisions for them would require significant airframe changes and a reduction in the vehicle's payload to compensate for their weight and volume. Moreover, the cost associated with the use of these gyros is a significant proportion of the total vehicle cost in many cases.

SUMMARY

Example embodiments of the present disclosure provide systems for angular rate and position measurement. Briefly described, in architecture, one example embodiment of the system, among others, can be implemented as a plurality of micro electro mechanical system (MEMS) gyroscopes; a plurality of MEMS accelerometers; at least one environmental sensor; a processor communicatively coupled to the plurality of MEMS gyroscopes and the plurality of MEMS accelerometers; an enclosure configured to enclose the plurality of MEMS gyroscopes, the plurality of MEMS accelerometers, and at least one environmental sensor; and encapsulent potting for filling the enclosure, wherein the processor calculates a correction value using outputs from the plurality of MEMS gyroscopes, the plurality of MEMS accelerometers, and the at least one environmental sensor; and applies the correction value to an output of the system.

Embodiments of the present disclosure can also be viewed as providing methods for angular rate and position measurement. In this regard, one embodiment of such a method, among others, can be broadly summarized by: receiving outputs of a plurality of encapsulated micro electro mechanical system (MEMS) gyroscopes; receiving outputs of a plurality of encapsulated MEMS accelerometers; receiving an output of at least one environmental sensor; calculating a correction value using the outputs of the plurality of MEMS gyroscopes, the outputs of the MEMS accelerometers, and the output of the at least one environmental sensor; and applying the correction value to an angular rate and position measurement.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
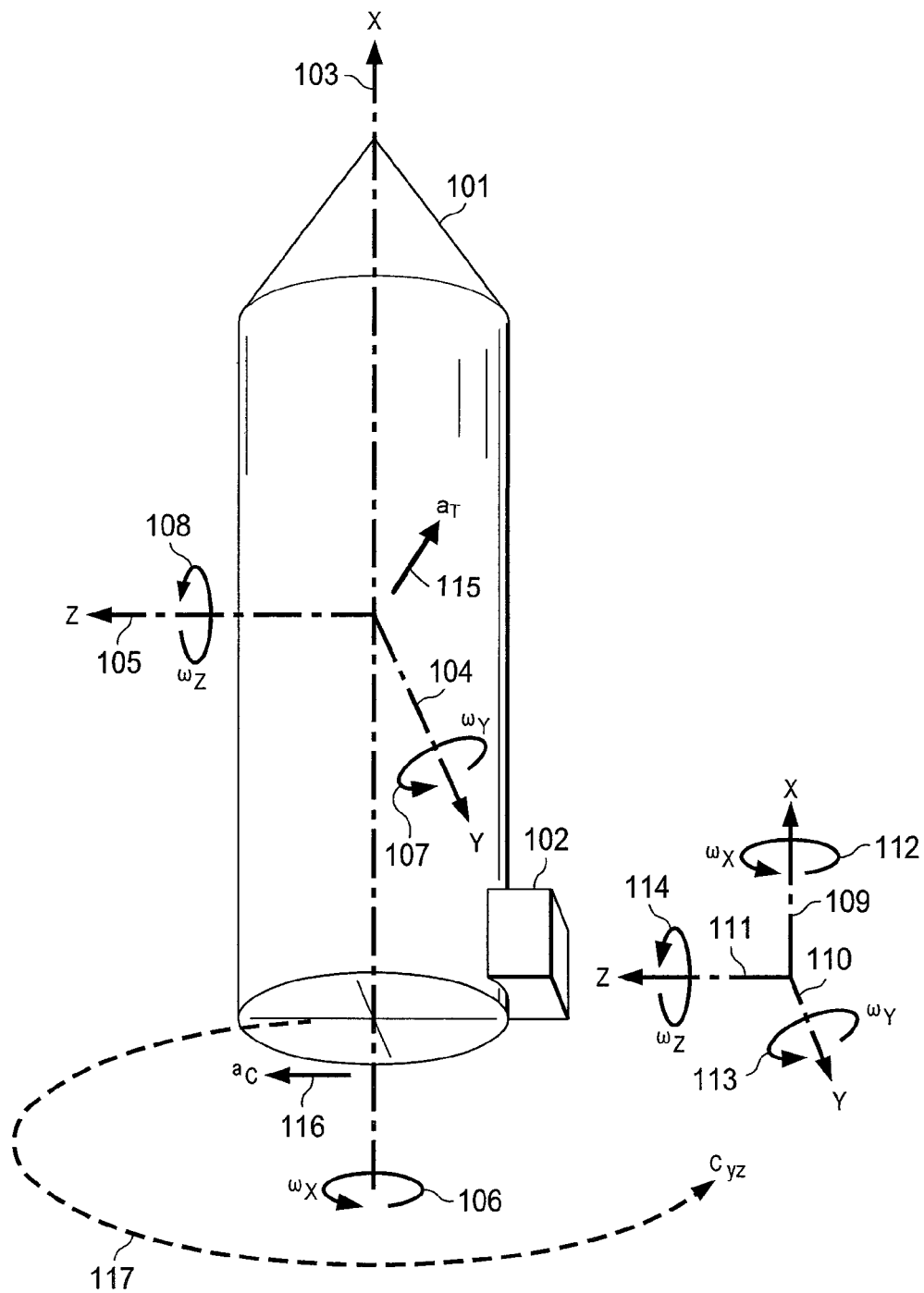
FIG. 1 is a perspective view of an example embodiment of a system of angular rate and position measurement attached to a vehicle.

MEMS gyroscopes have been available for many applications at less than $1000 per unit, but are not useful for guiding aerospace vehicles because of their lack of precision, degradation of the outputs due to rapid accelerations, large differences in angular rates between the different axes, accumulated path heading errors caused by misalignments between the individual gyroscopes, and sensor output corruption caused by high levels of acoustic sound and mechanical vibration. The disclosure presented herein provides a solution for angular and position measurement using these MEMS devices.

Example embodiments will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

The logic included in at least one of the example embodiments can be implemented in hardware, software, firmware, or a combination thereof. In some example embodiments, the logic is implemented in software or firmware that is stored in a memory and that is executed by a suitable instruction execution system. If implemented in hardware, as in an alternative embodiment, the logic can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of example embodiments in logic embodied in hardware or software-configured mediums.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer readable medium can be, for example, but not limited to an electronic, magnetic, optical, electromagnetic, infrared, or semiconductor system, apparatus, or device. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the present disclosure includes embodying the functionality of the example embodiments of the present disclosure in logic embodied in hardware or software-configured mediums.

Any process descriptions or blocks in flow charts should be understood as representing modules, segments, or portions of code which include one or more executable instructions for implementing specific logical functions or steps in the process, and alternate implementations are included within the scope of the example embodiment of the present disclosure in which functions may be executed out of order from that shown or discussed, including substantially concurrently or in reverse order, depending on the functionality involved. In addition, the process descriptions or blocks in flow charts should be understood as representing decisions made by a hardware structure such as a state machine known to those skilled in the art.

The disclosure provided herein allows the use of miniature MEMS (Micro Electro Mechanical Systems) gyroscopes in some aerospace vehicle applications, particularly those in which size, weight and affordability are more important than extreme sensor accuracy. It extends the usefulness of MEMS gyroscopes and accelerometers into high noise and vibration applications due to its unique insensitivity to these environments. Although this disclosure often details the use of systems and methods of angular rate and position measurement in regard to an aerospace vehicle, the example embodiments disclosed herein could also be used in industrial and commercial applications as well, including, but not limited to cellular telephones; cameras; sporting equipment as golf clubs, bats, hockey sticks, etc.; equipment to drive laser light shows; industrial robotic mechanisms that operate in high noise and vibration levels.

Systems and methods of angular rate and position measurement are provided that combine a small footprint with hardening and isolation technologies that allow it to function in acceleration, angular rate, noise, and vibration environments that cause other gyroscopes to either fail or to produce erroneous outputs. This combination of attributes allows external packaging on the surface of aerospace vehicles, which is an extremely challenging environment. The disclosed systems and methods for angular rate and position measurement may contain one or more of accelerometers, gyroscopes, analog and digital ancillary electronics and a processor (e.g., a digital signal processor) all housed within a very low height, precision machined, metal housing, which is also filled with vibration reducing encapsulating compound. The disclosed systems and methods for angular rate and position measurement are capable of measuring and correcting internal errors and perturbations caused by the longitudinal and angular accelerations and temperature excursions of aerospace vehicles, isolating the gyroscope elements from the effects of acoustic noise and vibration, and accurately measuring the relatively small pitch and yaw oscillations of the vehicle in its flight path trajectory.

The systems and methods for angular rate and position measurement of this disclosure differ from other gyroscopes used in highly dynamic and noisy environments, both in footprint and in the ability to compensate for the effects of the environment. The state of the art technology for gyroscope sensors in this field is large precision gyroscopes that typically utilize fiber optic or ring laser technology to sense perturbations in the yaw and pitch axes of a vehicle's trajectory. Fiber optic or ring laser gyros exhibit large size and weight that prohibit their use externally on the vehicle body. Moreover, the cost associated with the use of fiber optic or ring laser gyros is more than an order of magnitude greater than the disclosed example embodiments.

Known technologies for determination of angular rates and positioning may include the use of gyroscope sensors whose outputs are either discriminated against a threshold level or digitized and numerically integrated to determine if and where a correction should be made to the rocket's trajectory. Threshold discrimination of the analog gyroscope's output lacks precision since the resolution or determination of the trajectory error is limited by the number of gyroscopes used to measure the error. Numeric integration of gyroscope signals incorporates electronic noise with the integration that grows over time. Additionally, numeric integration is computationally intensive requiring high performance processing capabilities and more power consumption from the electronic system performing the operation.

The systems and methods for angular rate and position measurement disclosed herein improve on the state of the art by allowing the use of miniature Micro Electro Mechanical Systems (MEMS) gyroscopes in applications where severe linear accelerations, angular rate mismatches between axes, high vibration levels and high acoustic noise levels normally require the use of large and expensive ring laser or fiber optic gyroscopes mounted on the centerline of the vehicle, usually over the center of gravity. Example embodiments disclosed herein allow MEMS gyroscopes to be mounted externally to a structure (for example, an airframe of a previously manufactured aerospace vehicle) where it is exposed to extreme and extremely degrading levels of acoustic noise, vibration, and both linear and centripetal acceleration. The external mounting, however, greatly cheapens and simplifies the process of retrofitting guidance packages to previously unguided vehicles since the vehicle does not have to be disassembled or structurally modified during the retrofit process.

FIG. 1 provides a coordinate system and coordinate axes of a movable object such as, in this nonlimiting example embodiment, an aerospace vehicle. Vehicle 101 and its axes of X 103, Y 104, and Z 105 of linear motion in addition to its angular motion $\omega_x$ 106, $\omega_y$ 107 and $\omega_z$ 108 are depicted. Gyroscope assembly 102 is attached to vehicle 101. In FIG. 1, the vehicle roll rate ($\omega_x$) 106 may be three orders of magnitude greater than the transverse angular rates $\omega_y$ 107 and $\omega_z$ 108. The transverse angular rates $\omega_y$ 107 and $\omega_z$ 108 may act together to create an undesirable irregular coning motion of the vehicle as it travels along its flight path. The direction of the intended flight path is depicted by acceleration vector (115). To counter the undesirable motion in planes Y 104 and Z 105, $\omega_y$ 107, and $\omega_z$ 108 are accurately measured and related to higher level system components for correction.

An example embodiment contains three single axis MEMS accelerometers mounted mutually orthogonally and aligned with the axes of the vehicle (103, 104, and 105). An example embodiment with gyroscope assembly 102 offset from the vehicle axes is shown in FIG. 1. In this non-limiting embodiment, gyroscope assembly 102 is mounted externally to the vehicle. The example embodiment of FIG. 1 further utilizes three single axis MEMS gyroscopes each aligned parallel with one of axes 109, 110, and 111 to measure angular rates 112, 113, and 114.

Figure 2A:
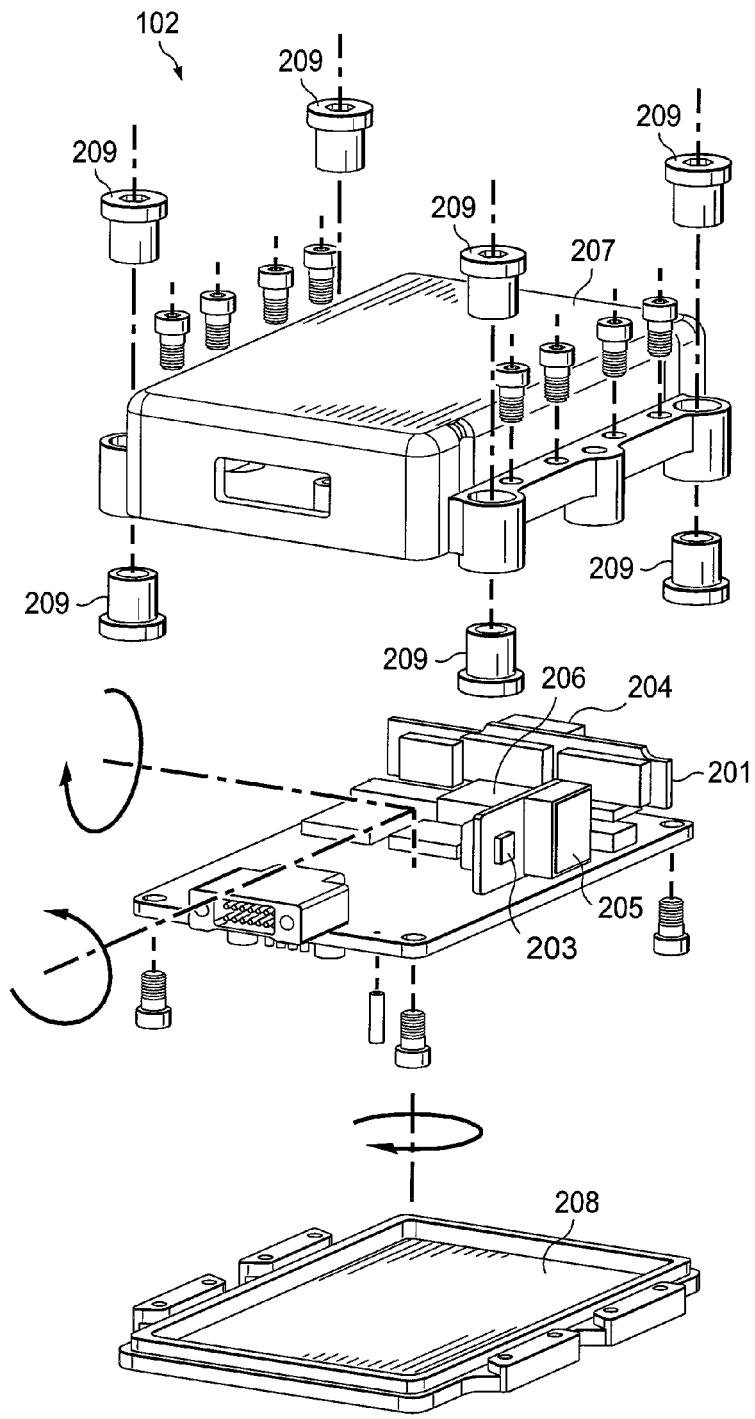
FIG. 2A is a perspective view of the example embodiment of the system of angular rate and position measurement of FIG. 1.
Figure 2B:
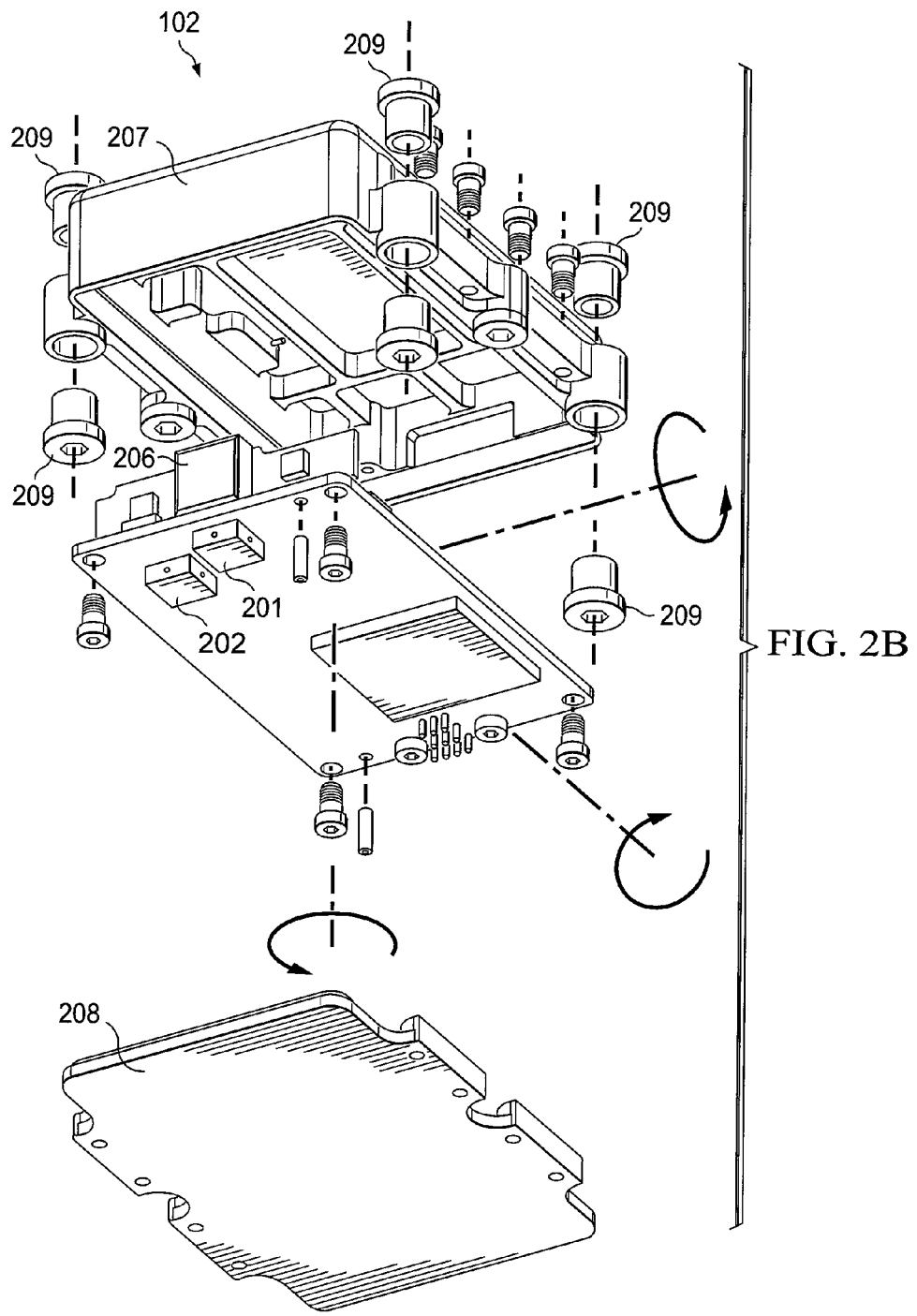
FIG. 2B is a perspective view of the example embodiment of the system of angular rate and position measurement of FIG. 1.

Exploded views of an example embodiment of gyroscope assembly 102 are provided in FIGS. 2A and 2B. An example embodiment as provided in FIGS. 2A and 2B comprises three single axis MEMS accelerometers 201, 202, and 203 mounted mutually orthogonal and aligned with the axes 109, 110, and 111 of gyroscope assembly 102. Three single axis MEMS gyroscopes 204, 205, and 206 may each be aligned with the corresponding accelerometer.

Several novel concepts may be utilized to enable a MEMS gyroscope to be used in the challenging dynamic environment of an aerospace vehicle launch and flight, particularly when gyroscope assembly 102 is contained inside an add-on package attached to the outside of vehicle 101. MEMS gyroscopes may be susceptible to accuracy degradation due to linear accelerations, changes in temperature, cross axis angular rates, acoustic noise and structural vibration. The systems and methods for angular rate and position measurement disclosed herein measure the environmental variables that corrupt the gyroscope's accuracy and utilize the measurements in compensation techniques applied in a processor to correct the gyroscope's outputs to an accurate state. These corrections additionally enable the gyroscope to be mounted externally on the aerospace vehicle platform where the centripetal and tangential accelerations would decrease the accuracy of a typical gyroscope.

External mounting, which is made possible by the low (for example, less than 0.5 inch) packaging height of gyroscope assembly 102, allows a cost effective increase in precision for some aerospace vehicle platforms without reducing payload capacity. In addition, it allows for the retrofit of self contained guidance kits onto previously manufactured vehicles without any disassembly or modification whatsoever to the existing vehicle assembly.

The linear acceleration environment of some aerospace vehicles may exceed 3000 ft/sec$^2$, which may cause a fluctuating bias shift in the pitch and yaw gyroscopes, which may corrupt an angular rate measurement. However, in the disclosed systems and methods for angular rate and position measurement, accelerometers may be used to continuously monitor the aerospace vehicle acceleration, and a correction factor may be applied to the pitch and yaw gyroscope outputs to correct this error.

Similarly, the typical roll rate of more than 4000 deg/sec for roll stabilized vehicles affects the pitch and yaw gyroscopes due to cross-axial sensitivity, causing a second source of error. Since most expected aerospace vehicle pitch and yaw rates are less than 10 degrees per second and must be measured to an accuracy of less than 0.5 degree per second, the three orders of magnitude difference in angular rate between the different axes means that the error signal on the pitch and yaw axes may often be greater than the true signal.

As with the linear acceleration, the roll rate typically varies with time, such that the magnitude of the error term varies with time as well. Yet another error source may arise since an example embodiment of the systems and methods for angular rate and position measurement may be mounted on the surface of the vehicle airframe, well away from the centerline of the roll axis. Centripetal acceleration effects may influence both the accelerometers and gyroscopes. The centripetal acceleration error may be removed by applying correction coefficients to each axis where its influence appears. Additionally, small misalignments of the gyroscopes with respect to each other or with respect to the vehicle exacerbate the cross axial sensitivities, making the true signal even more difficult to detect and identify.

The systems and methods for angular rate and position measurement disclosed herein use correction factors determined through testing of each gyroscope 204, 205, 206 to correct for these sensitivities. This technique determines the sensitivities of gyroscopes 204, 205, 206, measures the environment using the other sensors in the package, and internally applies a correction to the output of each gyroscope 204, 205, and 206.

Error sources that may affect MEMS gyroscopes 204, 205, 206 in vehicle 101 are acoustic noise response and vibration response. These energy inputs act either directly upon the gyroscope sensing elements or upon their enclosure structure to increase the level of internal signal noise. When this occurs, a gyroscope sensing element may resonate in response to the sound and vibration environment and may become incapable of measuring angular rates. In testing, MEMS gyroscopes have begun to show significant signal degradation at sound levels of 90 dB. Their output essentially becomes meaningless at sound levels of 120 dB.

A processor and other ancillary analog and digital electronics may be mounted to several printed circuits housed inside housing 207 along with the accelerometers 201, 202, and 203 and gyroscopes 204, 205, 206. Non-limiting materials for housing 207 include aluminum, titanium, or other materials such as materials that espouse properties of high strength, low weight and thermally conductivity. The systems and methods for angular rate and position measurement disclosed herein produce acceptable angular rate and position data at sound levels in excess of 140 dB. This is accomplished by completely filling the gyroscope enclosure 207 with encapsulant potting (in an example embodiment, electrically insulative but thermally conductive to minimize gyroscope bias drift due to internal heating) and by isolating housing 207 within an acoustic foam enclosure. The vibration response may be essentially eliminated at input levels above 1 g root mean square (which causes severe bias shifting and output signal noise corruption for most MEMS gyroscopes) by incorporating elastomeric grommet type isolators 209 at some or all mounting locations and through the beneficial effect of the encapsulant potting fill inside the unit.

The noise, vibration and shock (NVS) protection may allow an example embodiment of the systems and methods for angular rate and position measurement to produce clean (sensor noise floor increases by less than 2) and accurate outputs while fastened to the outside of the nozzle of an operating solid fuel rocket motor, for example.

Example embodiments of the systems and methods for angular rate and position measurement disclosed herein may utilize three orthogonally mounted gyroscopes and a digital signal processor to measure and compute via a trigonometric formula the exact vector direction of the error in the rocket's yaw and pitch plane thereby allowing an accurate flight control corrective action to be taken. This method avoids the growing error and processor overhead in numeric integration and is more accurate and less expensive than threshold discrimination.

Additionally, housing 207 may be filled with vibration absorbing material that isolates the electronic components from the external environment. Housing base 208 attaches to the housing to provide an environmental seal and to complete the assembly. Vibration absorbing grommets 209 may be inserted into the mounting holes of gyroscope assembly 102 and may be retained by friction in an example embodiment. Gyroscope assembly 102 may be less than half an inch high, which allows its external mounting on aerospace vehicles and facilitates its use in industrial environments.

Gyroscopes 204, 205, and 206 and accelerometers 201, 202, and 203 may be connected to electronic circuits via conventional printed circuit board technologies to form gyroscope assembly 102. Gyroscope assembly 102 may then be mounted into a precision machined housing enclosure (such as enclosure 207 made of aluminum or similar structural material to maintain a precise alignment of the inertial sensors. The entire assembly 102 is then completely filled with vibration absorbing material and sealed by attaching housing bottom plate 208. Vibration absorbing soft mounts 209 may be inserted into attachment holes of the Miniature Compensated Digital Gyroscope housing, where they may be held by friction. Gyroscope assembly 102 may be attached to aerospace vehicle 101 or some other industrial or commercial platform for angular rate measurement.

Gyroscopes 204, 205, 206 and accelerometers 201, 202, 203 may be MEMS devices exhibiting tuned dynamic ranges matching the characteristics of the environment dynamics. In some example embodiments, a printed circuit may use standard multi-layer FR4 and plated copper. Housing 207 may be aluminum or titanium or similar high strength, low weight, thermally conductive material. The vibration absorbing fill material may be a thermally conductive epoxy material. The thermally conductive epoxy material may have a hardness of Shore D 80 or greater in some example embodiments. Vibration absorbing grommets 209 may be comprised of an elastomeric material with stiffness properties tuned to the frequency range of interest for the application. Non-limiting example materials for the grommets may include EPDM rubber, elastomeric fluoropolymer, visloelastic urethane polymer or urethane.

An operation cycle of systems and methods for angular rate or position measurement may begin with the launch of an aerospace vehicle such as vehicle 101 of FIG. 1. When the vehicle propulsion unit becomes active, vehicle 101 may begin accelerating in the positive X-axis 103 and rolling in positive $\omega_x$ axis 106. As vehicle 101 reaches free space and is unconstrained by supporting launch mechanical systems, external perturbing influences such as winds and internal manufacturing tolerances may cause vehicle 101 to develop transverse angular rates ($\omega_y$ 107 and $\omega_z$ 108) that manifest in a coning motion. The coning motion that degrades the accuracy of vehicle 101 may be only contained in the $\omega_y$ 107 and $\omega_z$ 108 axes and is modulated between the two axes by the roll rate of the third axis contained in $\omega_x$. This combination of dynamics may create an undesirable irregular coning motion as vehicle 101 moves along its flight path.

As vehicle 101 is undergoing the dynamics described above, digital gyroscope 102 starts its cycle of operation by simultaneously acquiring a sample from each accelerometer 201, 202, and 203, each gyroscope 204, 205, and 206 and associated temperature sensors and converting the samples into digital signals. Once converted to a digital format, the signals are filtered to a frequency band of interest, corrected for temperature drift, corrected for cross-axes effects and corrected for g-sensitivities. The corrected measurements are then packetized and transmitted to an onboard flight computer that further processes the signal to determine the vector direction in which to make a vehicle flight path trajectory correction. The systems and methods for angular rate and position measurement may automatically sense and correct for its internal perturbations and errors while being exposed to the extreme longitudinal acceleration, roll rate and acceleration, noise and vibration imposed by its mounting on the outside of a solid rocket motor nozzle during an aerospace vehicle launch, for example.

Figure 3:
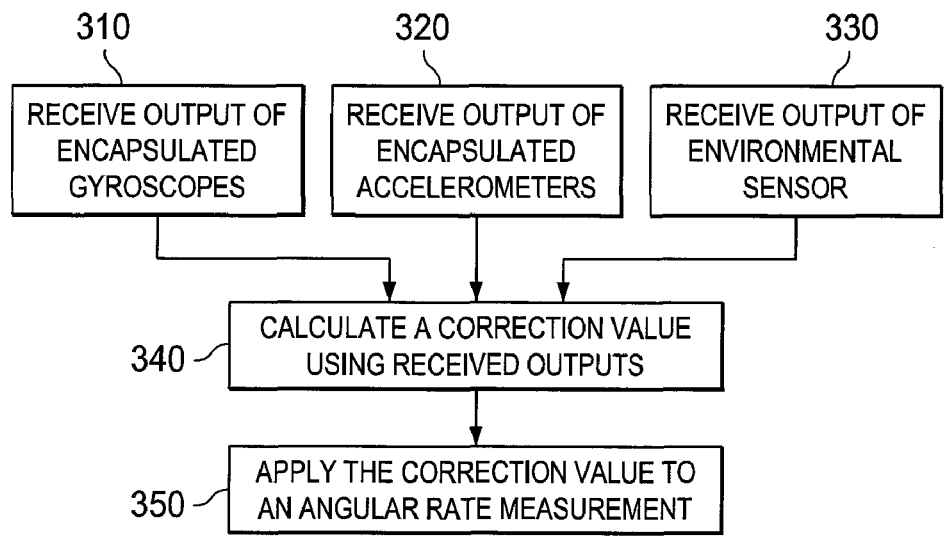
FIG. 3 is a flow chart of an example embodiment of a method of angular rate and position measurement.

FIG. 3 provides an example embodiment of a method for angular rate and position measurement. In block 310, the output of a plurality of encapsulated gyroscopes is received. In block 320, the output of a plurality of encapsulated accelerometers is received. In block 330, the output of at least one environmental sensor is received. In block 340, a correction value is calculated based on the received outputs of the plurality of gyroscopes, of the plurality of accelerometers, and of the at least one environmental sensor. In block 350, the correction value is applied to an angular rate measurement.

The systems and methods for angular rate and position measurement may measure yaw and pitch errors in an aerospace vehicle's trajectory when gyroscope assembly 102 is mounted in an external package fastened to the outside of vehicle 101. Mounting gyroscope assembly 102 to the outside of vehicle 101 allows higher level system components to minimize the trajectory perturbations that degrade the accuracy of the flight of vehicle 101. Its unique combination of an extremely low packaging height, ruggedness, and ability to compensate for both its own internal errors and perturbations and for those imposed by the extreme acceleration, noise and vibration of the vehicle environment allows its use in applications that normally cause MEMS based gyroscopes to fail. These environments are similar to many industrial environments, particularly in terms of noise and vibration exposure. The application of gyroscope assembly 102 will also work well in many industrial and commercial applications.

The flow chart of FIG. 3 shows the architecture, functionality, and operation of a possible implementation of the angular rate and position measurement software. In this regard, each block represents a module, segment, or portion of code, which comprises one or more executable instructions for implementing the specified logical function(s). It should also be noted that in some alternative implementations, the functions noted in the blocks may occur out of the order noted in FIG. 3. For example, two blocks shown in succession in FIG. 3 may in fact be executed substantially concurrently or the blocks may sometimes be executed in the reverse order, depending upon the functionality involved, as will be further clarified hereinbelow.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and to be protected by the following claims.

Therefore, at least the following is claimed:
1. A system comprising:
   a plurality of micro electro mechanical system (MEMS) gyroscopes;
   a plurality of MEMS accelerometers;
   at least one environmental sensor;

a processor communicatively coupled to the plurality of MEMS gyroscopes and the plurality of MEMS accelerometers;
an enclosure configured to enclose the plurality of MEMS gyroscopes, the plurality of MEMS accelerometers, and the at least one environmental sensor; and
mechanical isolators positioned at least one mounting location of the enclosure;
the mechanical isolators comprising elastomeric grommet isolators; and
encapsulent potting for filling the enclosure,
wherein the processor
calculates a correction value using outputs from the plurality of MEMS gyroscopes, the plurality of MEMS accelerometers, and the at least one environmental sensor; and
applies the correction value to an output of the system.

2. The system of claim 1, wherein the correction value is calculated using at least one of
measured sensitivities of at least one of the plurality of MEMS gyroscopes; and
measured environmental values from the at least one environmental sensor.

3. The system of claim 1, wherein the enclosure is attached to a movable object.

4. The system of claim 3, wherein the movable object is an aerospace vehicle.

5. The system of claim 3, wherein the plurality of MEMS gyroscopes comprises at least three MEMS gyroscopes each aligned parallel with a plane normal to a rotational axis of the movable object.

6. The system of claim 1, wherein the plurality of MEMS accelerometers comprises at least three MEMS accelerometers aligned mutually orthogonally.

7. A system comprising:
a plurality of micro electro mechanical system (MEMS) gyroscopes;
a plurality of MEMS accelerometers;
at least one environmental sensor;
a processor communicatively coupled to the plurality of MEMS gyroscopes and the plurality of MEMS accelerometers;
an acoustic foam enclosure configured to enclose the plurality of MEMS gyroscopes, the plurality of MEMS accelerometers, and the at least one environmental sensor; and
encapsulent potting for filling the acoustic foam enclosure,
wherein the processor
calculates a correction value using outputs from the plurality of MEMS gyroscopes, the plurality of MEMS accelerometers, and the at least one environmental sensor; and
applies the correction value to an output of the system.

8. A system comprising:
an aerospace vehicle; and
a system for measuring angular rate of motion comprising:
a plurality of micro electro mechanical system (MEMS) gyroscopes;
a plurality of MEMS accelerometers;
at least one environmental sensor;
a processor communicatively coupled to the MEMS gyroscope and MEMS accelerometers;
an acoustic foam enclosure configured to enclose the plurality of gyroscopes, the plurality of accelerometers, and the at least one temperature sensor; and
encapsulent potting filling the enclosure,
wherein the processor
calculates a correction value using outputs from the plurality of MEMS gyroscopes, the plurality of MEMS accelerometers, and the at least one environmental sensor; and
applies the correction value to an output of the system.

9. The system of claim 8, wherein the correction value is calculated using at least one of
a measured sensitivity of at least one of the plurality of MEMS gyroscopes;
a measured sensitivity of at least one of the plurality of MEMS accelerometers; and
a measured environmental value from the at least one environmental sensor.

10. The system of claim 8, further comprising mechanical isolators positioned at least one mounting location of the enclosure.

11. The system of claim 8, wherein the plurality of MEMS accelerometers comprises at least three MEMS accelerometers aligned mutually orthogonally.

12. The system of claim 8, wherein the plurality of MEMS gyroscopes comprises at least three MEMS gyroscopes each aligned parallel with a plane that contains a rotational axis of the vehicle.

13. The system of claim 8, wherein the processor is a digital signal processor.

* * * * *